United States Patent
Shindgikar et al.

(10) Patent No.: US 8,479,817 B2
(45) Date of Patent: Jul. 9, 2013

(54) METHOD AND COMPOSITION FOR CURING LOST CIRCULATION

(75) Inventors: Nikhil Shindgikar, Paris (FR); Jesse Lee, Paris (FR)

(73) Assignee: Schlumberger Technology Corporation, Sugar Land, TX (US)

(*) Notice: Subject to any disclaimer, the term of this patent is extended or adjusted under 35 U.S.C. 154(b) by 395 days.

(21) Appl. No.: 12/810,431

(22) PCT Filed: Dec. 23, 2008

(86) PCT No.: PCT/EP2008/011055
§ 371 (c)(1),
(2), (4) Date: Sep. 29, 2010

(87) PCT Pub. No.: WO2009/080358
PCT Pub. Date: Jul. 2, 2009

(65) Prior Publication Data
US 2011/0005758 A1 Jan. 13, 2011

(30) Foreign Application Priority Data

Dec. 26, 2007 (EP) ..................... 07291625

(51) Int. Cl.
*C09K 8/035* (2006.01)
*C09K 8/487* (2006.01)
*E21B 33/13* (2006.01)
*E21B 21/00* (2006.01)

(52) U.S. Cl.
USPC ........... 166/283; 166/291; 166/292; 166/295; 166/300; 175/65; 175/72; 507/117; 507/124; 507/219; 507/230; 507/901; 507/903

(58) Field of Classification Search
None
See application file for complete search history.

(56) References Cited

U.S. PATENT DOCUMENTS

| | | | | |
|---|---|---|---|---|
| 2,935,472 | A | * | 5/1960 | Klaas et al. ................... 507/104 |
| 3,593,798 | A | | 7/1971 | Darley |
| 5,582,249 | A | | 12/1996 | Caveny et al. |
| 5,782,300 | A | | 7/1998 | James et al. |
| 2006/0042797 | A1 | | 3/2006 | Fredd et al. |
| 2006/0157244 | A1 | | 7/2006 | Reddy et al. |
| 2006/0283591 | A1 | * | 12/2006 | Willberg et al. ............ 166/280.1 |
| 2011/0297375 | A1 | * | 12/2011 | Shindgikar et al. ........... 166/276 |

FOREIGN PATENT DOCUMENTS

| | | |
|---|---|---|
| EP | 1284248 | 8/2008 |
| WO | 2004101704 | 11/2004 |
| WO | 2005121500 | 12/2005 |

OTHER PUBLICATIONS

SPE 73791: Effect of Material Type and Size Distribution on Performance of Loss/Seepage Control Material, Ali. A. Pilehvari, and Venkata R. Nyshadham, SPE, Texas A&M, University Kingsville.
SPE 54323: Current Materials and Devices for Control of Fluid Loss, Colby M. Ross, James Williford and Michale W. Sanders, Halliburton Energy Services inc.

* cited by examiner

*Primary Examiner* — George Suchfield
(74) *Attorney, Agent, or Firm* — Michael Dae

(57) ABSTRACT

A system for curing lost circulation is made of fibers and a material able to stick fibers in a network when activated. Such activation can be temperature or pH change or both. The fibers can be metallic amorphous fibers, metallic non-amorphous fibers, glass fibers, carbon fibers, polymeric fibers and combinations thereof. The material can be a fiber coating or an additional material, for example polyvinyl alcohol, polyurethane and heat activated epoxy resin.

20 Claims, 2 Drawing Sheets

METHOD AND COMPOSITION FOR CURING LOST CIRCULATION

FIELD OF THE INVENTION

The present invention broadly relates to well treating. More particularly the invention relates to a composition designed to cure lost circulation in general, including cementing, drilling, completion and related method for curing lost circulation in a well, such as for instance oil or gas well.

DESCRIPTION OF THE PRIOR ART

Cement in oil and gas wells is placed in the annular gap between the drilled formation and the steel casing. Its primary main function is to prevent any fluid communication between the drilled formations to provide long-term zonal isolation. Lost circulation is a common problem encountered during drilling and cementing, which accounts for significant amount of non-producing time. Many prior art's products and techniques have been developed to solve this problem. One of the most practiced techniques is to add conventional loss circulation material (LCM) to the drilling fluids, cement slurries or pills. Recently, the use of well-defined fibers has become popular due to its superior performance, and has been used successfully with drilling fluids and cement slurries. Patent applications WO2004101704, US20060157244 and patents U.S. Pat. No. 5,782,300, EP1284248 disclose such systems. Combination with other granular material was also tested (reference can be found in scientific papers from Society of Petroleum Engineers, SPE73791 and SPE54323). However, fiber does not perform adequately when the severity is high. Increasing fiber concentration could improve the performance but will risk plugging service equipment and BHA, thus render this approach non-practical.

For this reason, it is important to develop a new technology with improved fiber performance and excellent loss circulation properties without necessarily increasing fiber concentration.

SUMMARY OF THE INVENTION

The invention discloses a system for use in a well, comprising fibers and a material able to stick fibers in a network when activated. By activation it is meant that the material which has no or little adhesive property becomes adhesive when subjected to an activation which can be of any type as mechanical (stress), chemical (pH) or physical (temperature). Preferably, the material is activated by change of temperature and/or pH.

The fibers can be: metallic amorphous fibers, metallic non-amorphous fibers, glass fibers, carbon fibers, polymeric fiber (polypropylene, novoloid, glass, polylactic resin) or a mixture thereof.

The material can be embodied as a coating on a part of the fibers or as an additional material in instance, polyvinyl alcohol (PVOH) fibers, polyurethane fibers, or heat activated epoxy resin coated fibers. When PVOH fibers are used a cross-linker can be added if necessary.

The system of the invention can be used with a base fluid made of water preferably with a hydraulic cement or with a base fluid made of oil.

According to another aspect of the invention a method for treatment in a well is disclosed, the method comprising the steps of: pumping in the well a composition made of fibers and a material able to stick fibers in a network; and allowing the composition to form the network in the well by activating the sticking. The method is preferably used with systems as disclosed previously.

The method applies advantageously to cure lost circulation of a zone in the well, so the method comprises further the step of drilling the well and the composition forms the network in the vicinity of the zone.

The method can be used with a hydraulic cement added to the composition, or with the composition used as a drilling fluid for the drilling step, or as a spacer. Drilling fluid can be oil-based mud or water-based mud.

BRIEF DESCRIPTION OF THE DRAWINGS

Further embodiments of the present invention can be understood with the appended drawings.

DETAILED DESCRIPTION

Figure 1:
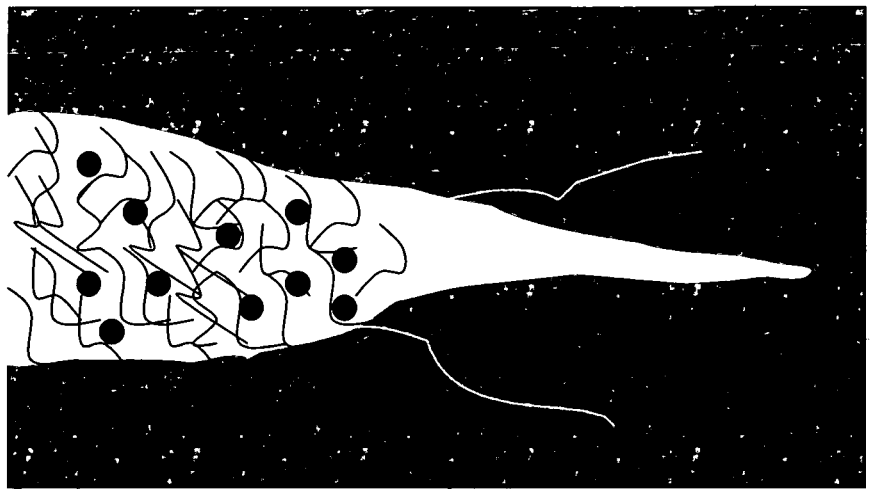
FIG. 1 shows schematic diagram referring to mechanism of action of the loss circulation material according to prior art.
Figure 2:
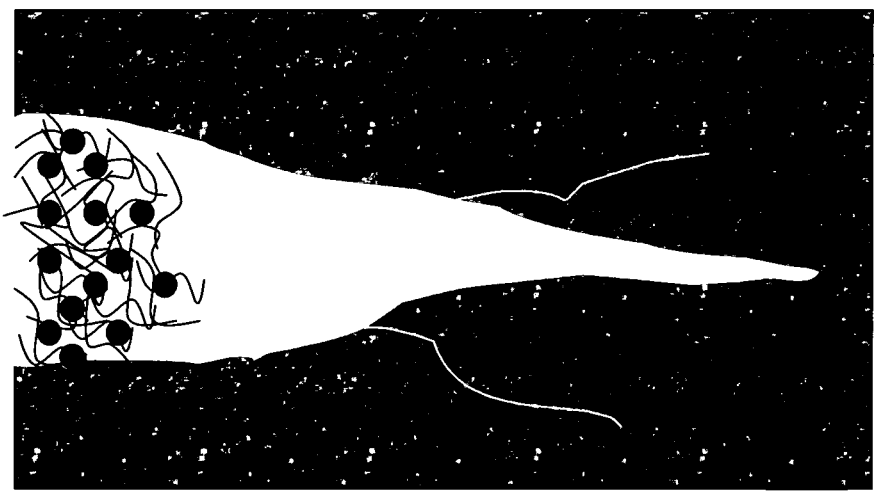
FIG. 2 shows schematic diagram referring to mechanism of action of the loss circulation material according to the invention.

Prior art solutions describe the use of different fibers based on their dispersion in water to form a fibrous net (FIG. 1). In instance, the formed network collects solid particles and forms a filter cake. The present invention is based on a different system. Current invention uses fibers which become sticky at certain temperatures and/or at higher pH environment. Preferably the system becomes sticky downhole and forms a sticky fibrous net (FIG. 2) able to be used in various applications. The sticky fiber mixture will collect and retain maximum solid particles in the drilling fluid or cement slurry to quickly form a much needed filter cake.

The system according to the invention is made of fibers and a material able to stick said fibers in a network when activated. In the broadest sense, sticky properties could come from the fibers directly or can be introduced as an additional material. For example, one could use fiber made of or coated with the material that has adhesive properties when activated. Also, in another embodiment, these adhesive materials can be added and mixed with conventional fibers. Alternatively, there exists other possible combination, as long as one of the components possesses adhesive properties.

The material has adhesive properties which are subjected to be activated. The activation can be made by time (over retarder system which will glue after a certain time), by mechanical action (stress of the material which will activate the sticking), by change of a physical property (increase of temperature), by change of a chemical property (increase/decrease of pH) and/or by addition of a component (cross-linker). Preferably, the activation is dependent of the use of the system in such a way no special modification of the system is needed. For example when system is used downhole in the well, temperature increase will be a natural activation of the system.

Once the adhesive property is triggered, non-soluble materials as particulate material will bond to each other and then bridge and plug where needed. This can be better understood by comparing to the spider web, which catches material with its sticky property, and thus eventually forms an impermeable barrier and stops pathway. Such a use of sticky fibers can reduce the requirement of high solids content or fiber concentrations in the fluid formulation as they can improve the low concentration fiber performance with combination of sticky fibrous network.

Current invention is for use within a well in any type of fluids that are pumpable. Preferably, invention can be used in well treatments in conjunction with water-based mud, oil-based mud, spacer, or cement slurries . . . . The primary application is for curing lost circulation; however the technique can be expanded to other wellbore treatment such as gravel packing, proppant flowback control, wellbore consolidation and others. In this way, sticky material facilitates the formation of impermeable barriers, which stops fluid from losing into the fractures or the cracks of formation in interest. To form the impermeable barrier, insoluble solid additives in the wellbore service fluids need to physically or chemically support each other and adhere to the surface of the fractures. By insoluble solid additives it is meant solid additives which remain insoluble at the downhole conditions. The introduction of the sticky material acts as "glue" and thus improves the efficiency of forming the barriers, and also strengthens the adhesion to the fracture surfaces. Using sticky fibers or materials may increase the efficiency of the fibers even when the fibers are not homogeneously dispersed. This subsequently leads to better efficiency in regards to curing lost circulation.

For instance, fibers are commonly used during the well treatment for solving the lost circulation problem. Those fibers are generally mineral fibers, as glass fiber, carbon fiber or metallic fiber made of amorphous or non-amorphous metal. Also polymeric fibers can be used. According to the invention, polyvinyl alcohol (PVOH) fibers are added to those common fibers. The total fiber concentration used in the field is in the range of 2 ppb to 5 ppb. Higher fiber concentrations can plug the mixing equipment on the rig site. The fiber mixture is pumped downhole where the temperature commonly is in the range of 40° C. to 100° C.; this increase of temperature is used as a trigger to introduce the stickiness property. As such, PVOH fibers start to hydrolyze when it reaches certain temperature, and this partial hydrolization gives PVOH fibers the sticky property. The composition will build a stronger network and stop fluid losses much more efficiently compared to system from prior art. In addition, the stickiness will catch more solid particles which also will contribute to forming the impermeable barriers.

A cross-linker can be added to PVOH fibers to further enhance the performance. The cross-linker can be sodium pentaborate or boric acid. In case of oil-based mud, small concentration of water is sufficient to partially hydrolyze PVOH at temperature. These fibers will not dissolve completely, but will become sticky due to their partial dissolution.

Figure 3:
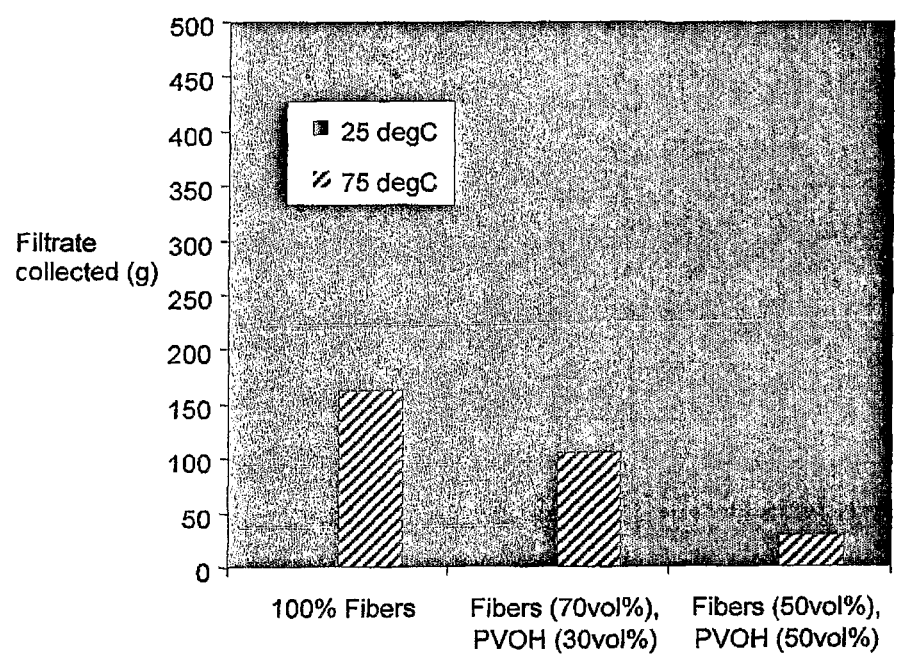
FIG. 3 shows comparison results between system of prior art and system according to the invention.

Comparison tests were made with prior art system and are shown on FIG. 3. The solution of the invention comprises a mixture of glass fibers and PVOH fibers. Glass fibers are 12 mm long and 12 microns in diameter. PVOH fibers are around 6 mm long and approximately 18 microns in diameter. At 70° C., PVOH fibers becomes sticky and bonds to glass fibers and the fiber network also catches more solid particles, as such, forms an impermeable barrier early (as shown on FIG. 2). When using glass fibers along, the rate of forming a network and catching enough particles is slower than the system containing sticky component, thus, forms an impermeable barrier much later. It is possible this barrier will never become impermeable without the sticky component (as shown on FIG. 1).

The performance of lost circulation solutions can be characterized by measuring the amount of fluid flowing through an opening with pre-defined geometry. In FIG. 3, all the tests comprise equal volume of fibers. At 25° C., replacing 30% in volume and 50% in volume of glass fibers with shorter PVOH fibers led to more leakoff compared to glass fibers along, which indicates less control for lost circulation. When testing temperature was raised to 70° C., the amount of leakoff decreased significantly for the mixed fibers, especially in the case of 50% in volume of PVOH. This indicates better performance and efficiency for controlling lost circulation. These results clearly demonstrate the benefit of having sticky materials as part of the lost circulation solution.

In general, the different solid particles and additives present in the drilling fluids and cement slurry are in the range of 200 microns to 300 microns. The sticky material used in this invention are different types of treated PVOH fibers that partially hydrolize in water at various temperatures. These treated fibers are in the range from 1.5 mm to 6 mm long and have a diameter of approximately from 10 microns to 300 microns. The fibers tested were 1.5 mm to 6 mm long and have a diameter of approximately 18 microns. The other option is to coat fibers with PVOH, and the choice for the base fiber can be polypropylene, novoloid, glass, polylactic resin with approximate length of 10 mm to 12 mm and a diameter of 15 microns to 20 microns.

The invention claimed is:

1. A composition for use in a well, the composition comprising fibers in an amount of from 2 ppb to 5 ppb and a material able to stick fibers in a network when activated; wherein the material, chosen from the list consisting of polyvinyl alcohol fibers, polyurethane fibers, or heat activated epoxy resin coated fibers, is embodied as a coating on a part of the fibers.

2. The composition of claim 1, wherein the material is activated by change of temperature or pH, or both.

3. The composition of claim 1, further comprising a cross-linker.

4. The composition as claim 1, wherein the fibers are selected from the list consisting of: metallic amorphous fiber, metallic non-amorphous fiber, glass fiber, carbon fiber, polymeric fiber and mixtures thereof.

5. The composition of claim 1, further comprising a hydraulic cement.

6. A method for treatment in a well comprising:
pumping in the well a composition comprising fibers in an amount of from 2 ppb to 5 ppb and a material able to stick fibers in a network when activated; wherein the material, chosen from the list consisting of polyvinyl alcohol fibers, polyurethane fibers, or heat activated epoxy resin coated fibers, is embodied as a coating on a part of the fibers;
activating the material able to stick fibers; and
allowing the network to be formed.

7. The method of claim 6, further comprising the step of drilling the well.

8. The method of claim 7, wherein the composition is used as a drilling fluid.

9. The method of claim 8, wherein the drilling fluid is oil-based mud.

10. The method of claim 8, wherein the drilling fluid is water-based mud.

11. The method according to claim 6, wherein the activation is made by a change of temperature in the well or a change of pH in the well, or both.

12. The method according to claim 6, wherein the activation is made by a cross-linker added to the composition.

13. The method according to claim 6, wherein the composition is a spacer.

14. A method for curing lost circulation in a subterranean well penetrating one or more formations, the formations having one or more fractures through which fluids may flow, comprising:
   drilling a well;
   pumping in the well a composition comprising fibers in an amount of from 2 ppb to 5 ppb and a material able to stick fibers in a network when activated; wherein the material, chosen from the list consisting of polyvinyl alcohol fibers, polyurethane fibers, or heat activated epoxy resin coated fibers, is embodied as a coating on a part of the fibers;
   activating the material able to stick fibers; and
   allowing a network to be formed thereby facilitating the formation of impermeable barriers, which stops fluid from flowing into the fractures.

15. The method according to claim 14, wherein the material is activated by change of temperature or pH, or both.

16. The method according to claim 14, wherein the activation is made by a cross-linker added to the composition.

17. The method according to claim 14, wherein the fibers are selected from the list consisting of metallic amorphous fiber, metallic non-amorphous fiber, glass fiber, carbon fiber, polymeric fiber and mixtures thereof.

18. The method according to claim 17, further comprising a hydraulic cement.

19. The method according to claim 14, wherein the composition is pumped in the drilling fluid while drilling to limit lost circulation while drilling.

20. The method according to claim 19, wherein the drilling fluid is oil based or water based mud.

\* \* \* \* \*